United States Patent
Suenaga

(10) Patent No.: US 10,871,789 B2
(45) Date of Patent: Dec. 22, 2020

(54) REGULATOR

(71) Applicant: NIKKI CO., LTD., Kanagawa-ken (JP)

(72) Inventor: Naoya Suenaga, Kanagawa-ken (JP)

(73) Assignee: NIKKI CO., LTD. (JP)

(*) Notice: Subject to any disclaimer, the term of this patent is extended or adjusted under 35 U.S.C. 154(b) by 0 days.

(21) Appl. No.: 16/149,115

(22) Filed: Oct. 1, 2018

(65) Prior Publication Data
US 2019/0101942 A1 Apr. 4, 2019

(30) Foreign Application Priority Data

Oct. 2, 2017 (JP) ................................. 2017-193078

(51) Int. Cl.
*F16K 31/12* (2006.01)
*G05D 16/10* (2006.01)

(52) U.S. Cl.
CPC ......... *G05D 16/106* (2013.01); *G05D 16/103* (2013.01); *Y10T 137/7808* (2015.04)

(58) Field of Classification Search
CPC .............................................. Y10T 137/7808
See application file for complete search history.

(56) References Cited

U.S. PATENT DOCUMENTS

| | | | | |
|---|---|---|---|---|
| 2,888,949 A * | 6/1959 | Evans | ..................... | A62B 9/022 137/505.25 |
| 3,435,843 A * | 4/1969 | Spencer | ............... | G05D 16/103 137/505.25 |
| 4,020,863 A * | 5/1977 | Fabish | ................... | G05D 16/10 137/116.5 |
| 5,860,447 A * | 1/1999 | Chu | ..................... | G05D 16/103 137/493.8 |
| 6,374,853 B1 * | 4/2002 | Callies | ............... | G05D 16/0608 137/495 |
| 7,191,790 B1 * | 3/2007 | Mele | ........................ | A62B 9/02 128/202.27 |
| 2002/0088495 A1 * | 7/2002 | Semeia | ............... | B63C 11/2209 137/505.25 |
| 2007/0284004 A1 * | 12/2007 | Ungerecht | ......... | G05D 16/0655 137/505.25 |
| 2009/0242043 A1 * | 10/2009 | Lev | .................... | H01M 8/04201 137/505.25 |
| 2015/0259057 A1 * | 9/2015 | Solari | ................. | B63C 11/2209 137/1 |

FOREIGN PATENT DOCUMENTS

JP          S52-92436 A         8/1977

* cited by examiner

*Primary Examiner* — Robert K Arundale
(74) *Attorney, Agent, or Firm* — Fishman Stewart PLLC

(57) ABSTRACT

A regulator may be configured to reduce an individual difference between products due to a size tolerance of each of a valve seated seat holding member, a valve seated seat, a piston pressure regulating valve, and a main body part. The main body part may be affected by a load of a pressure regulating spring, or a load variation at a set point of the pressure regulating spring. The regulator may be configured without a function loss due to a damage, leakage failure, or the like of the valve seated seat. A pressure regulating valve body 5 may be closely in contact with a valve seated seat 31, and a piston unit 6 that is formed around an outer periphery thereof and that affects a pressure regulating spring 8 are formed separately, the two forming a piston pressure regulating valve 7.

7 Claims, 8 Drawing Sheets

REGULATOR

CROSS-REFERENCE TO RELATED APPLICATION

This application claims priority to Japanese Application JP 2017-193078 filed on Oct. 2, 2017, the contents of which are hereby incorporated by reference in its entirety.

TECHNICAL FIELD

The present invention relates to a regulator used in reduction of pressure of high-pressure fluid into intended pressure.

BACKGROUND

A regulator that opens/closes a pressure regulating valve through a piston by pressure fluctuation in a pressure regulation chamber and that controls a flow rate of high-pressure fluid is known for a long time as presented in Japanese Unexamined Utility Model Publication No. S52-92436, and is used for a pressure regulator or the like of when high-pressure fuel such as CNG stored in a fuel tank is supplied to an engine, for example.

FIG. 5 to FIG. 8 are views illustrating an example of the regulator in related art. One open end of a tubular path 2 formed through a main body part 1 is an inlet port 21 of high-pressure fluid and the other open end thereof is an outlet port 22 of pressure-reduced fluid. An inlet cover 23 to airtightly introduce high-pressure fluid and an outlet cover 24 to airtightly extract pressure-regulated fluid pressure of which is regulated are respectively arranged in the inlet port 21 and the outlet port 22.

Also, a valve seat 3 including a seat holding member 33 that is a bulkhead in which a cylindrical valve seated seat 31 is provided inside by fitting of an outer peripheral projected edge provided in a projected manner on an outer peripheral end surface thereof into a fitting recessed part and in which a through hole 32 in an axial direction of the path 2 is formed is arranged in an inner side of the inlet port 21 in the path 2. A pressure regulation chamber 4 is formed in a direction on a side of the outlet port 22 of the valve seated seat 31 in the path 2.

Moreover, a piston pressure regulating valve 7 including a pressure regulating valve body 5, which includes a leading end surface 51 that can be closely in contact with the valve seated seat 31 of the valve seat 3 and which includes a tubular communicating path 52 both ends of which are opened, and a piston unit 6 that is formed around an outer periphery on a side of the outlet port 22 in the path 2 of the pressure regulating valve body 5 and that has a diameter larger than that of the pressure regulating valve body 5 is arranged slidably in the axial direction of the path 2 between the pressure regulation chamber 4 and the outlet port 22 in the path 2.

Furthermore, the piston unit 6 is biased in a circumference thereof in a direction of the outlet port 22 in the path 2 by a pressure regulating spring 8 that has a predetermined load and that is arranged in an atmosphere chamber 61 provided concentrically in parallel with the pressure regulation chamber 4. A load due to pressure of high-pressure fluid that is introduced from the inlet port 21, is introduced to the pressure regulation chamber 4 provided in such a manner as to face the valve seated seat 31 through the through hole 32 formed in the valve seated seat holding member 33 of the valve seat 3, passes through the pressure regulating valve body 5 in which the communicating path 52 is formed, and affects the piston unit 6 joined to the pressure regulating valve body 5 and a load by the pressure regulating spring 8 that affects the piston unit 6 to an opposite of the pressure regulation chamber 4 are balanced, whereby opening areas of the valve seated seat 31 and the pressure regulating valve body 5 are changed to control fluid pressure in the pressure regulation chamber 4. Accordingly, fluid regulated to intended pressure is extracted from the outlet port 22.

SUMMARY

However, in a pressure reduction structure of the regulator in related art, the pressure regulating spring 8 is inserted from the outlet port 22 before attachment of the outlet cover 24 and the piston pressure regulating valve 7 is subsequently inserted therefrom during assembly. Thus, there is a large individual difference between products due to a size tolerance of each of the valve seated seat holding member 33, the valve seated seat 31, the piston pressure regulating valve 7, and the main body part 1 affected by a load of the pressure regulating spring 8, or a load variation at a set point of the pressure regulating spring 8.

Also, as illustrated in FIG. 7 and FIG. 8, since the pressure regulating spring 8 is inserted from the outlet port 22 of the main body part 1 and the piston pressure regulating valve 7 is subsequently inserted therefrom, it is necessary to set a seat diameter (ds) of each of the valve seated seat 31 and the pressure regulating valve body 5 to be smaller than a diameter (db) of a high-pressure fuel airtight seal 91 in an outer peripheral part of the pressure regulating valve body 5.

Here, when introduction pressure of the inlet port 21 is Pin, a load applied in an opening direction of the piston pressure regulating valve 7 by the pressure regulating spring 8 is Fsp, extraction pressure of the outlet port 22 is Pout, an inner diameter of the communicating path 52 of the pressure regulating valve body 5 in the piston pressure regulating valve 7 is d, and a pressure-receiving diameter of the piston unit 6 is dp, a balance equation of the load applied to the piston pressure regulating valve 7 becomes the following equation (1).

[Math 1]

$$\frac{\pi}{4} \times \{(db)^2 - (ds)^2\} \times Pin + \frac{\pi}{4} \times \{(ds)^2 - (d)^2\} \times Pout + Fsp = \\ \frac{\pi}{4} \times \{(dp)^2 - (d)^2\} \times Pout \quad (1)$$

With further arrangement, the following equation (2) is acquired.

[Math 2]

$$\frac{\pi}{4} \times \{(ds)^2 - (ds)^2\} \times Pin + Fsp = \frac{\pi}{4} \times \{(dp)^2 - (ds)^2\} \times Pout \quad (2)$$

Here, since ds<db is acquired, a load in the opening direction becomes heavier as introduction pressure (Pin) becomes heavier. Thus, there is a problem that extraction pressure (Pout) varies greatly depending on the introduction pressure (Pin).

Also, since a cylindrical leading end of the pressure regulating valve body 5 is pressed to a plane surface of the valve seated seat 31 when a flow rate is shut off, there is a problem that a function loss is caused by a damage, leakage failure, or the like of the valve seated seat 31 due to local stress generation caused by flatness of a contact surface of the valve seated seat 31, squareness of the contact surface of the valve seated seat 31 to the pressure regulating valve body 5 with respect to an axis of the piston pressure regulating valve 7, and a deviation in axes of the pressure regulating valve body 5 and the valve seated seat 31.

The present invention is to solve the problem, that is, to reduce an individual difference between products due to a size tolerance of each of a valve seated seat holding member 33, a valve seated seat 31, a piston pressure regulating valve 7, and a main body part 1 affected by a load of a pressure regulating spring 8, or a load variation at a set point of the pressure regulating spring 8 and to provide a regulator without a function loss due to a damage, leakage failure, or the like of the valve seated seat 31.

In a regulator of the present invention provided to solve the above problem, one open end in a tubular path formed through a main body part is an inlet port of high-pressure fluid and the other open end thereof is an outlet port of pressure-reduced fluid, a pressure regulation chamber is arranged on an inner side of the inlet port in the path through a valve seat including a valve seated seat holding member which includes a valve seated seat on an inner side and in which a through hole in an axial direction of the path is formed, a piston pressure regulating valve including a pressure regulating valve body that has a leading end surface capable of being closely in contact with the valve seated seat and that includes a tubular communicating path with opened both ends, and a piston unit formed around an outer periphery, on a side of the outlet port in the path, of the pressure regulating valve body is biased in an outlet port direction in the path between the pressure regulation chamber and the outlet port in the path by a pressure regulating spring having a predetermined load and arranged slidably in the axial direction of the path in an atmosphere chamber provided coaxially in parallel with the pressure regulation chamber around the piston unit, fluid regulated to intended pressure by controlling of fluid pressure in the pressure regulation chamber by a change in opening areas of the valve seated seat and the pressure regulating valve body due to balancing between a load by pressure of high-pressure fluid that is introduced from the inlet port, is introduced into the valve seated seat and the pressure regulation chamber, which is provided in such a manner as to face the valve seated seat, through the through hole formed in the valve seated seat holding member of the pressure regulating valve body, passes through the pressure regulating valve body in which the communicating path is formed, and affects the piston unit joined to the pressure regulating valve body and a load by the pressure regulating spring that affects the piston unit to an opposite side of the pressure regulation chamber is extracted from the outlet port, the pressure regulating valve body closely in contact with the valve seated seat, and the piston unit that is formed around the outer periphery thereof and that affects the pressure regulating spring are formed separately, the two forming the piston pressure regulating valve, and the pressure regulating valve body inserted from the inlet port into the path and the piston unit inserted from the outlet port into the path are fit to each other in an intended axial direction position and subsequently fixed by at least one of press-fitting and welding.

According to the present invention, it becomes possible to set a pressure regulating spring in a designated load position during assembly. Thus, it is possible to prevent an individual difference between products due to a size tolerance of each of the valve seated seat holding member, the valve seated seat, the piston pressure regulating valve, and the main body part affected by a load of the pressure regulating spring, or a load variation at a set point of the pressure regulating spring and to keep uniform quality.

In particular, in the present invention, it is possible to easily and securely set the pressure regulating spring in a designated load position by monitoring a spring load and performing fixation in a state, in which a designated load is reached, when the pressure regulating valve body inserted from the inlet port into the path and the piston unit inserted from the outlet port into the path are fit to each other in an intended axial direction position.

Moreover, in the present invention, a diameter of the valve seated seat is made to be the same with a diameter of a high-pressure fuel airtight seal inserted and fit between an inner peripheral surface of the path, which is arranged in such a manner as to face the valve seated seat, and an outer periphery of the pressure regulating valve body. Thus, a pressure load of high-pressure fluid from a side of the inlet port which load is applied to the pressure regulating valve body is canceled and pressure on a side of the outlet port can be stabilized.

In addition, in a case where an inner peripheral leading end on a side of the valve seated seat of the regulating valve body is formed in a tapered shape enlarged toward a leading end direction, the valve seated seat is provided slidably, in an axial direction of the path, in a recessed part formed in the valve seated seat holding member through a buffer formed from a high-polymer material having elasticity. In a case where uniform contact between the pressure regulating valve body and the valve seated seat is possible, it is possible to securely make the valve seated seat and the pressure regulating valve body be in contact with each other closely and be closed during closing.

According to the present invention, it is possible to solve a variation due to an individual difference and to securely make a valve seated seat and a pressure regulating valve body be in contact with each other closely and be closed during closing.

DETAILED DESCRIPTION

Figure 1:
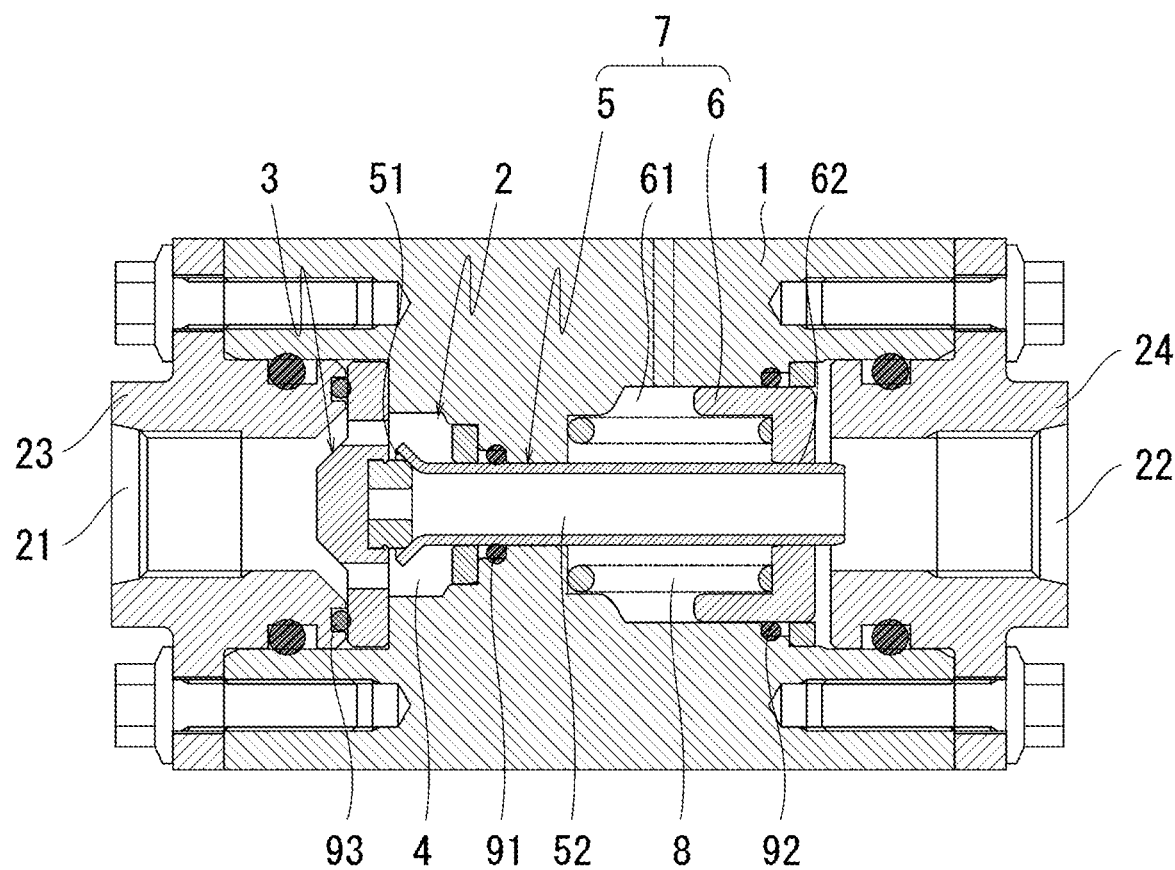
FIG. 1 is a sectional view illustrating an embodiment of the present invention of when a valve is closed.
Figure 2:
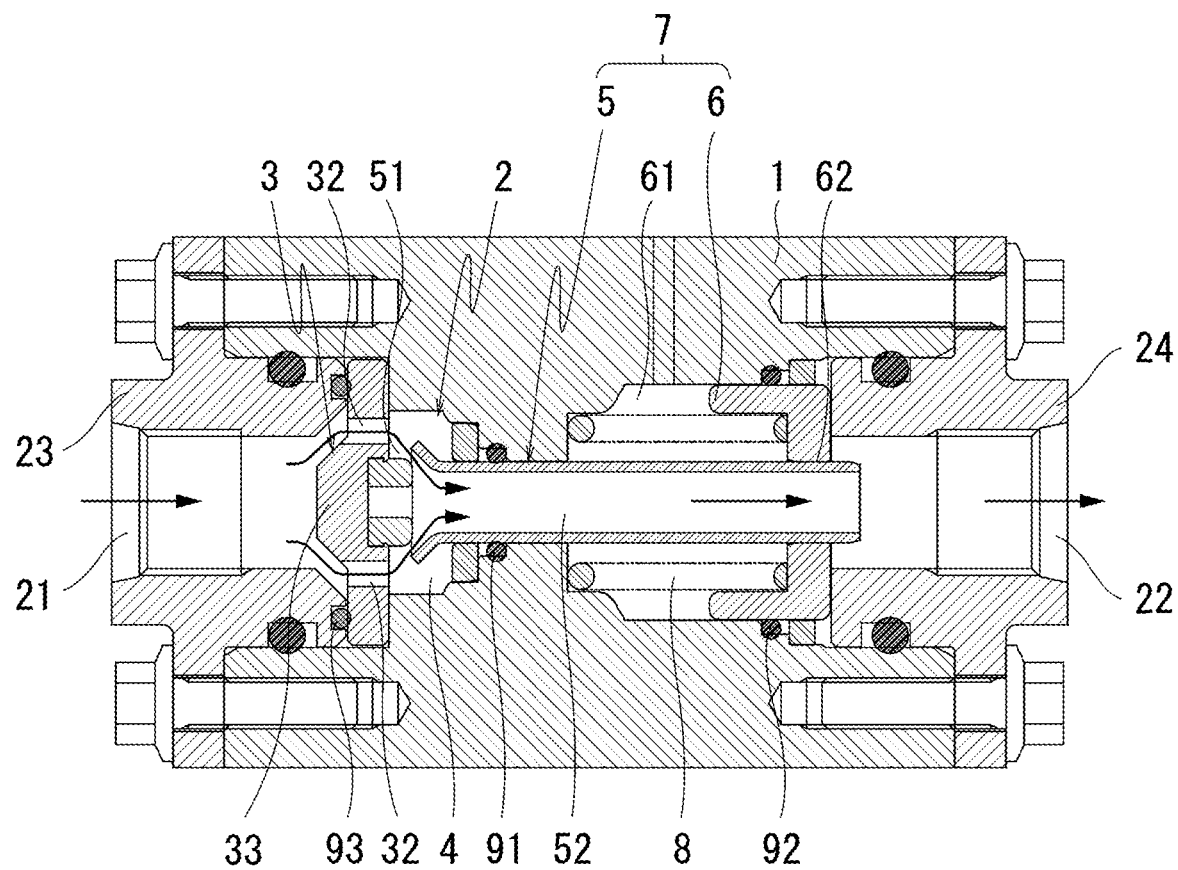
FIG. 2 is a sectional view illustrating the embodiment illustrated in FIG. 1 of when the valve is opened.

In the following, the present invention will be described with reference to the drawings.

FIG. 1 to FIG. 4 are sectional views of a preferred embodiment of the present invention. A whole configuration is substantially similar to that of related art illustrated in FIG. 5 to FIG. 8, and a detailed description of these parts is omitted. Also, the same sign is assigned to a configuration part identical to that of the related art and described.

Then, in particular, a point different from the related art is that a cylindrical pressure regulating valve body 5 closely in contact with a valve seated seat 31 and a cylindrical piston unit 6 that is formed around an outer periphery thereof and that affects a pressure regulating spring 8 are formed separately in a piston pressure regulating valve 7.

In the present embodiment, the pressure regulating valve body 5 and the piston unit 6 that is formed around the outer periphery thereof, the two being formed separately and forming the piston pressure regulating valve 7, are preferably formed in a close contact state in such a manner as to be insertable into a bore in which crimping is possible. It is preferably possible to temporarily join the two during assembly by inserting the pressure regulating valve body 5 separated from the piston unit 6 from an inlet port 21 into a path 2, inserting the piston unit 6 from an outlet port 22 into the path 2, and performing fitting to each other in a predetermined position in an axial direction in the path 2.

Moreover, in the present embodiment, a leading end, which is on a side in contact with the valve seated seat 31, of the cylindrical pressure regulating valve body 5 including a communicating path 52 inside has a tapered shape enlarged toward the leading end, a leading end on the opposite side has a shape of being joined to a coupling hole 62 in a center part of the piston unit 6, and an outer peripheral part is guided by a main body part 1 through a high-pressure fuel airtight seal 91. Also, an outer peripheral part of the piston unit 6 is guided by the main body part 1 through a seal member 92.

In particular, in the present embodiment, a seat diameter (Ds) of a part of the pressure regulating valve body 5 which part is in contact with the valve seated seat 31 is equivalent to a seat diameter (Db) between the high-pressure fuel airtight seal 91 provided in the outer peripheral part of the pressure regulating valve body 5, and the pressure regulating valve body 5.

Moreover, for example, a valve seated seat holding member 33 that forms a valve seat 3 is sandwiched in a step 11 inside the main body part 1 with a buffer 93 including an O-RING of a high-polymer material having high slidability and elasticity being between the inlet cover 23 to airtightly hold fuel and the valve seated seat holding member 33, and is semi-fixed only by elastic force of the buffer 93. The valve seated seat holding member 33 of the valve seat 3 has a structure of being slidable in a direction orthogonal to an axis.

A substantially whole configuration and a pressure-reducing method of the above present embodiment are substantially similar to those of related art illustrated in FIG. 5 to FIG. 8 described above. However, the cylindrical pressure regulating valve body 5 that is closely in contact with the valve seated seat 31 and the cylindrical piston unit 6 that is formed around an outer periphery thereof and that affects the pressure regulating spring 8, the two being formed by the piston pressure regulating valve 7, are formed separately. In assembly, the pressure regulating valve body 5 inserted from the inlet port 21 into the path 2 and the piston unit 6 inserted from the outlet port 22 into the path 2 are fit to each other in an intended axial direction position, and the pressure regulating valve body 5 and the piston unit 6 are fixed by welding or the like in a position, in which a load of the pressure regulating spring 8 becomes a designated load, and configure the piston pressure regulating valve 7.

Thus, setting at a constant load becomes possible even when there is a size tolerance of each of the valve seated seat holding member 33, the valve seated seat 31, the piston unit 6, the pressure regulating valve body 5, and the main body part 1 that are related components, a load variation in the pressure regulating spring 8, or the like. Thus, it is possible to make an individual difference between products as small as possible.

Figure 3:
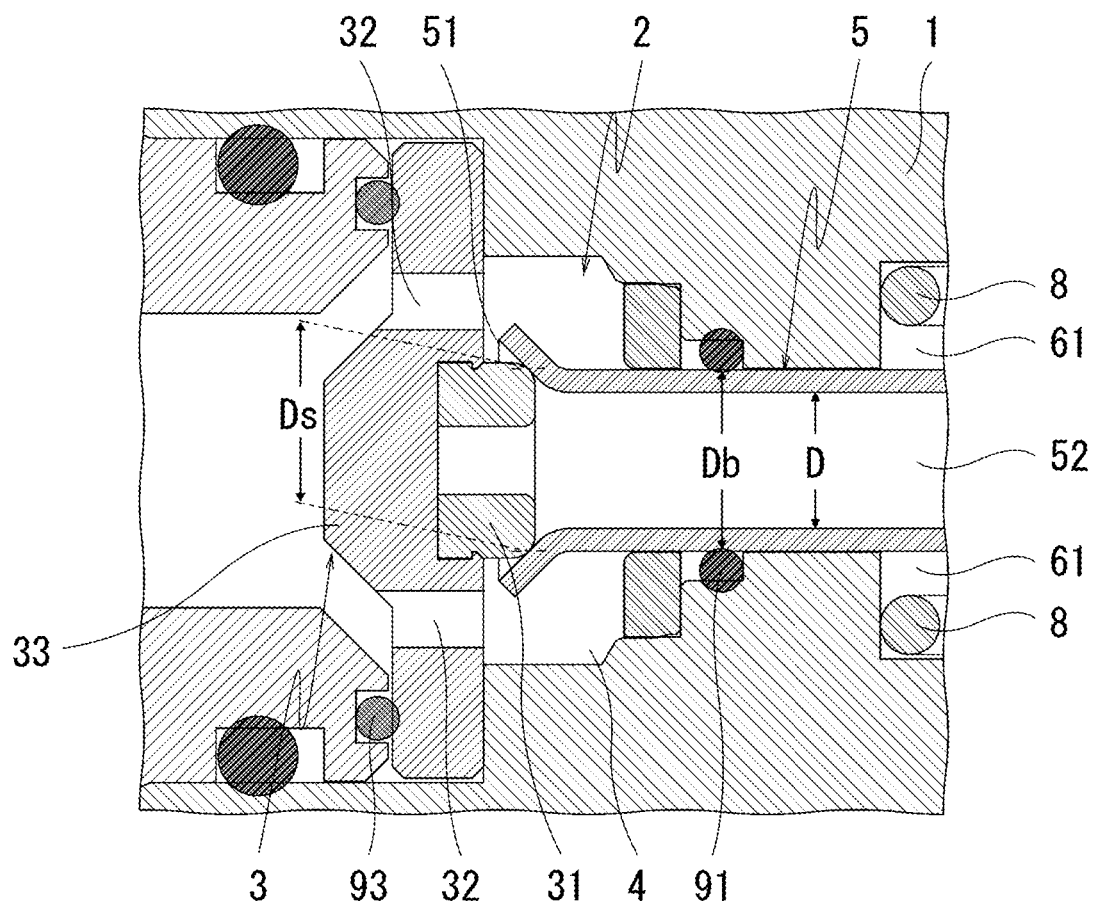
FIG. 3 is a sectional view in which a piston pressure regulating valve part of when the valve is closed in the embodiment illustrated in FIG. 1 is enlarged.
Figure 4:
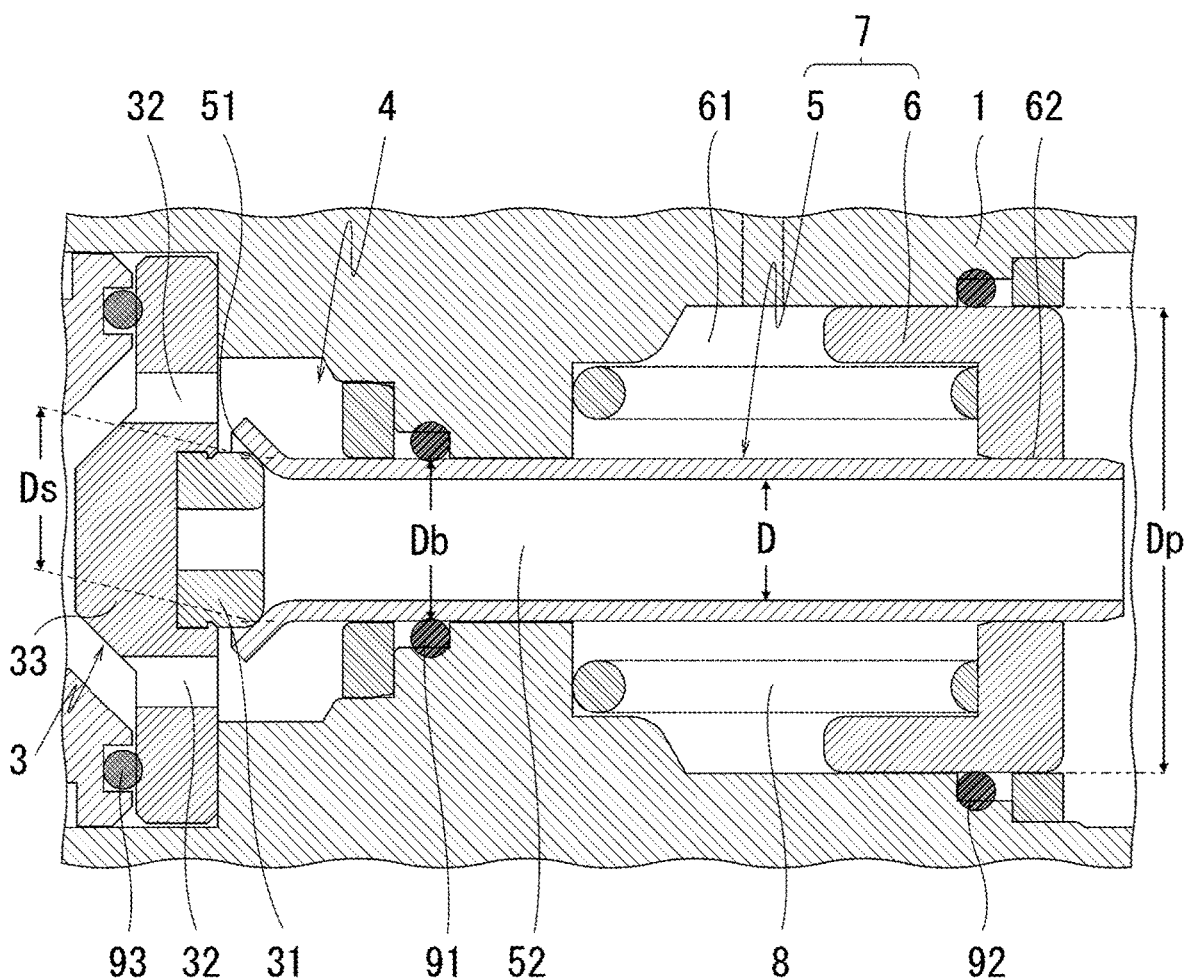
FIG. 4 is a sectional view in which a valve seat part of when the valve is closed in the embodiment illustrated in FIG. 1 is further enlarged.
Figure 5:
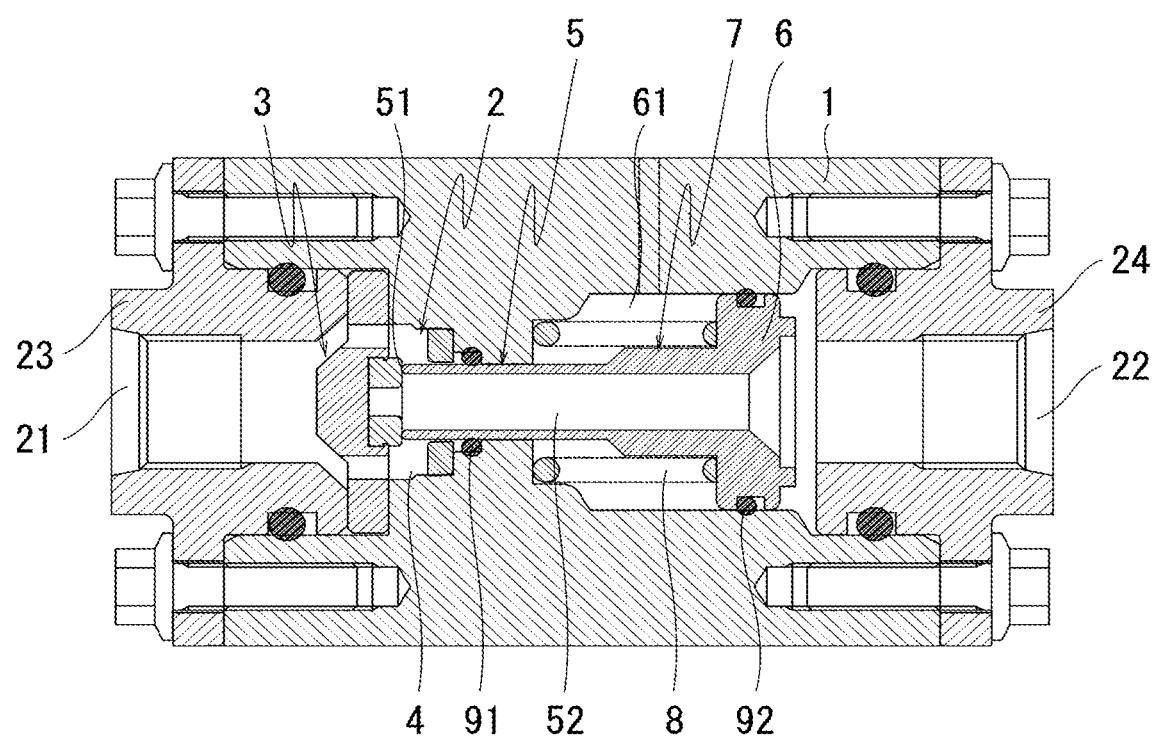
FIG. 5 is a sectional view illustrating an embodiment in related art of when a valve is closed.
Figure 6:
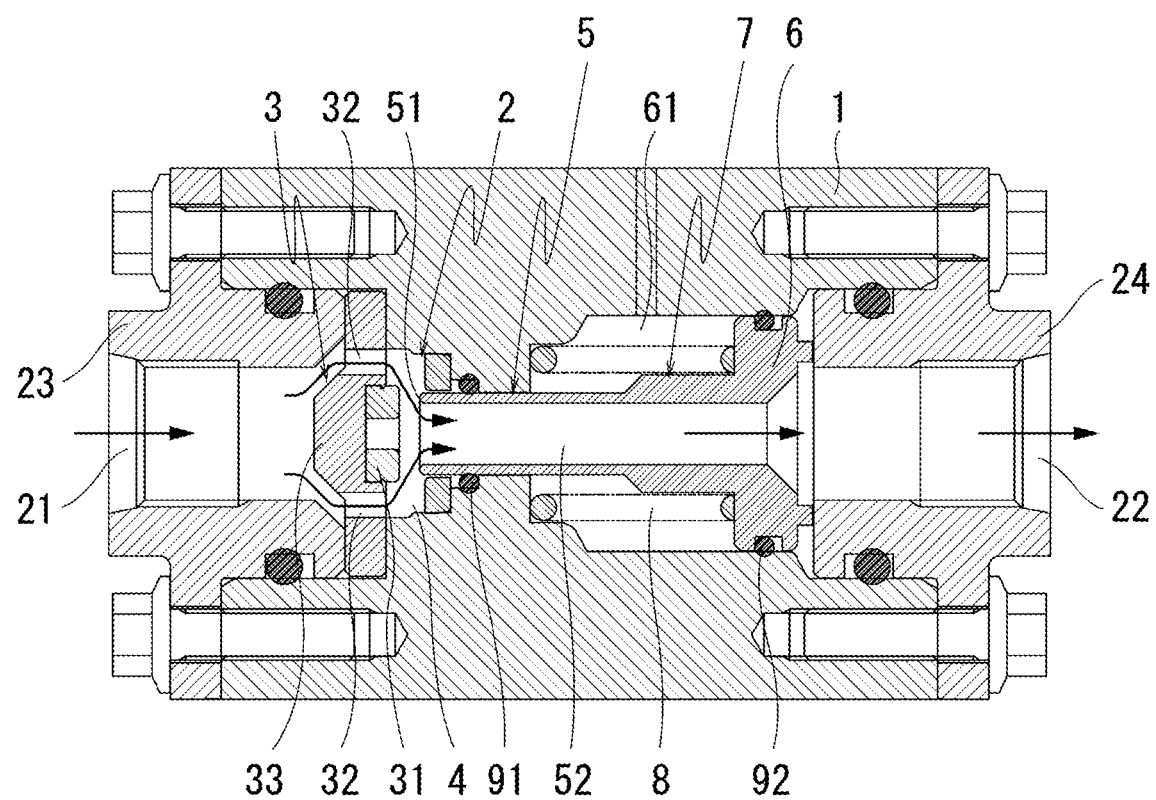
FIG. 6 is a sectional view illustrating the related art illustrated in FIG. 5 of when the valve is opened.
Figure 7:
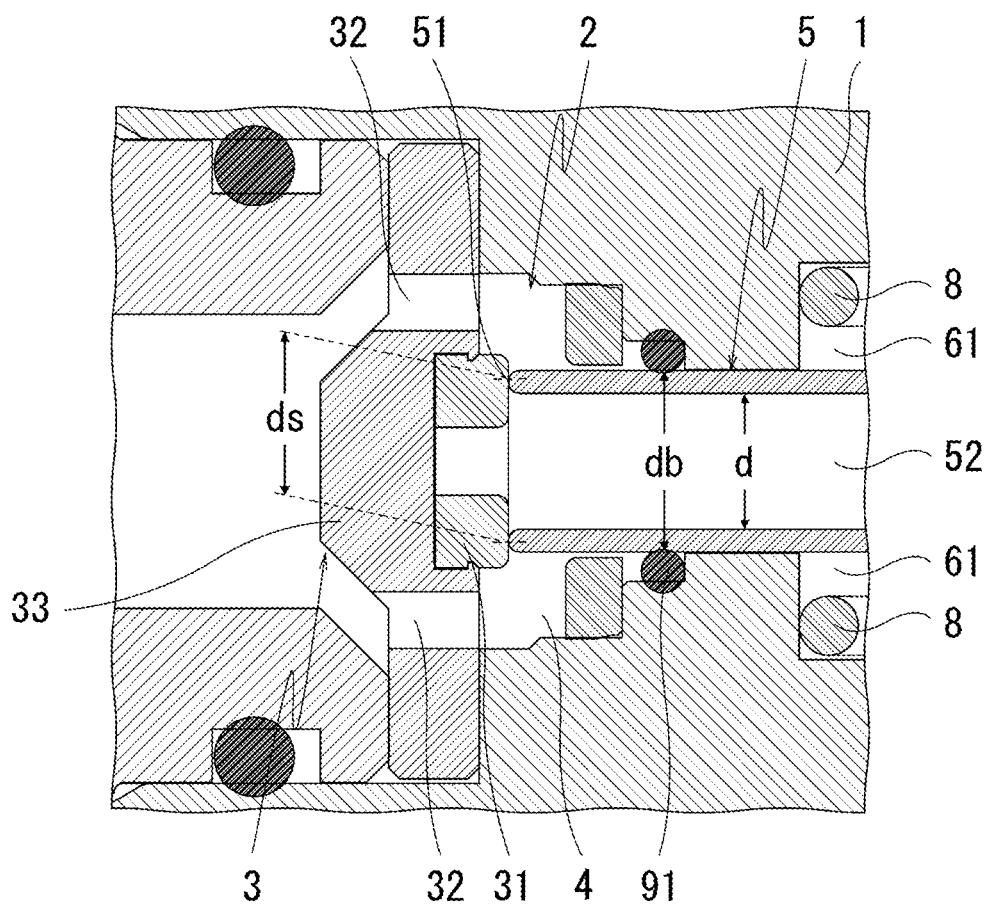
FIG. 7 is a sectional view in which a piston pressure regulating valve part of when the valve is closed in the related art illustrated in FIG. 5 is enlarged.
Figure 8:
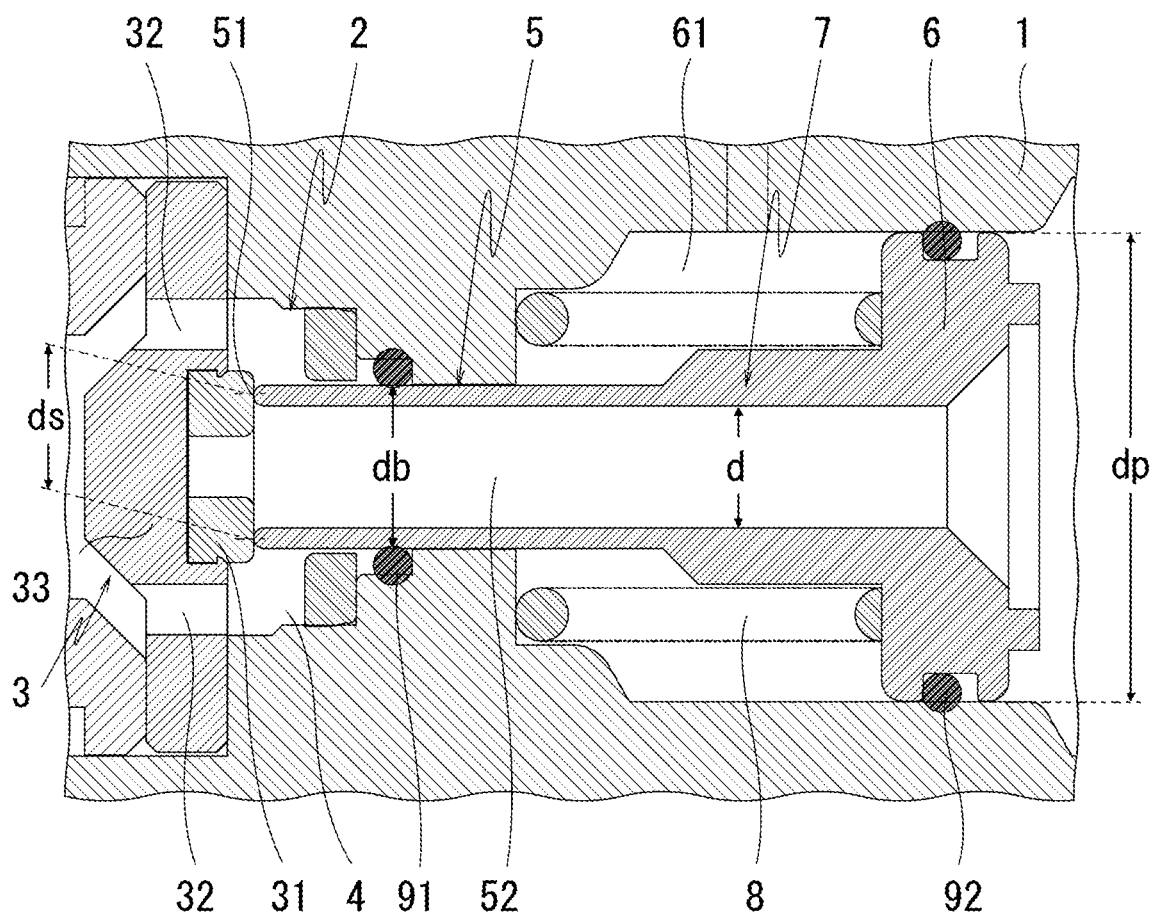
FIG. 8 is a sectional view in which a valve seat part of when the valve is closed in the related art illustrated in FIG. 5 is further enlarged.

Moreover, as illustrated in FIG. 3 and FIG. 4, with respect to each load that affects the piston pressure regulating valve 7, when fuel inlet pressure is Pin, a load applied in an opening direction of the pressure regulating valve body 5 by the pressure regulating spring 8 is Fsp, fuel outlet pressure is Pout, an inner diameter of the communicating path 52 of the pressure regulating valve body 5 is D, and a pressure-receiving diameter of the piston unit 6 is Dp, a balance equation of a load applied to the piston pressure regulating valve 7 becomes similar to the equation (1), and becomes similar to the equation (2) when being further arranged.

Here, when Ds≈Db, the above equation (1) and equation (2) are further arranged and the following equation (3) is acquired.

[Math 3]

$$Fsp = \frac{\pi}{4} \times \{(Dp)^2 - (Ds)^2\} \times Pout \qquad (3)$$

Thus, a load of the fuel inlet pressure (Pin) applied to the piston pressure regulating valve 7 can be canceled. Also, in the present embodiment, a diameter of the valve seated seat 31 that forms the valve seat 3 is formed to be the same with a diameter of the high-pressure fuel airtight seal 91 inserted and fit between an inner peripheral surface of the path 2, which is arranged in such a manner as to face the valve seated seat 31, and an outer periphery of the pressure regulating valve body 5. Thus, a pressure load of high-pressure fluid from a side of the inlet port 21 which load is applied to the pressure regulating valve body 5 is canceled and it is possible to stabilize reduced pressure on a side of the outlet port 22.

In addition, an inner peripheral leading end, which is on a side of the valve seated seat 31, of the pressure regulating valve body 5 is formed in a tapered shape enlarged toward a leading end direction, and the valve seated seat 31 is provided slidably in the axial direction of the path 2 in a recessed part formed in the valve seated seat holding member 33 through an airtight member including, for example, an elastic material.

Thus, when the valve seated seat 31 and the communicating path of the pressure regulating valve body 5 are closed and fuel is shut off, the valve seated seat holding member 33 that holds the valve seated seat 31 is slid and moved along with a contact part between the valve seated seat 31 and the pressure regulating valve body 5, the pressure regulating valve body 5 and the valve seated seat 31 are securely coaxial, and a contact surface between the valve seated seat 31 and the pressure regulating valve body 5 is uniformed, whereby an opening area of when a valve is opened also becomes uniform and it is possible to perform closing in such a manner that the valve seated seat 31 is closely in contact with the pressure regulating valve body 5 securely during closing. Moreover, since the inner peripheral leading end, which is on the side of the valve seated seat 31, of the pressure regulating valve body 5 is formed in a tapered shape enlarged toward the leading end direction, it becomes possible to automatically acquire effects such as valve leakage prevention, stabilization of a pressure-regulation performance, and control of a variation between products.

In particular, in the present embodiment, it is possible to fix the pressure regulating valve body 5 and the piston unit 6 in a designated load position while measuring a load of the pressure regulating spring 8 during assembly, fixation being usually performed by welding or the like. In a case where the pressure regulating valve body 5 and the piston unit 6 can be fit to each other by crimping, when pressure of used fluid is not that high, strength and airtightness can be secured in a temporally joined state in which fitting is performed in a press-fitted state, and a cost can be reduced by elimination of welding processing.

What is claimed is:

1. A regulator comprising: a main body part including a tubular path with a first open end and a second open end, wherein the first open end in the tubular path formed through the main body part is an inlet port of fluid and the second open end is an outlet port of pressure-reduced fluid; a pressure regulation chamber arranged on an inner side of the inlet port in the tubular path through a valve seat including a valve seated seat holding member which includes a valve seated seat on an inner side and in which a through hole in an axial direction of the tubular path is formed, a piston pressure regulating valve including a pressure regulating valve body that has a leading end surface capable of being in contact with the valve seated seat and that includes a tubular communicating path with first and second open ends; a piston unit formed around an outer periphery of a side of the outlet port in the tubular path, of the pressure regulating valve body is biased in an outlet port direction in the tubular path between the pressure regulation chamber and the outlet port in the tubular path by a pressure regulating spring having a predetermined load and arranged slidably in the axial direction of the tubular path in an atmosphere chamber provided coaxially in parallel with the pressure regulation chamber around the piston unit, wherein fluid is regulated to an intended pressure by controlling of fluid pressure in the pressure regulation chamber by a change in opening areas of the valve seated seat and the pressure regulating valve body due to balancing between a load by pressure of fluid that is introduced from the inlet port, is introduced into the valve seated seat and the pressure regulation chamber, which is provided in such a manner as to face the valve seated seat, through the through hole formed in the valve seated seat holding member of the pressure regulating valve body, passes through the pressure regulating valve body in which the communicating path is formed, and affects the piston unit joined to the pressure regulating valve body, wherein a load by the pressure regulating spring that affects the piston unit to an opposite side of the pressure regulation chamber is extracted from the outlet port, wherein the pressure regulating valve body is in contact with the valve seated seat at a contact location, and the piston unit that is formed around the outer periphery thereof and that affects the pressure regulating spring are formed separately, the two forming the piston pressure regulating valve, and the pressure regulating valve body inserted from the inlet port into the tubular path and the piston unit inserted from the outlet port into the tubular path are fit to each other in an intended axial direction position and subsequently fixed by at least one of press-fitting and welding, and wherein the pressure regulating body includes an inner peripheral leading end, on a side of the valve seated seat, having a tapered portion that is enlarged toward a leading end direction; and a fuel airtight seal, wherein the contact location and the fuel airtight seal have an equivalent diameter, the fuel airtight seal is configured to fit between an inner peripheral surface of the tubular path and the outer periphery of the pressure regulating valve body, the inner peripheral surface is arranged to face the valve seated seat, and the valve seated seat includes an outer peripheral edge having a rounded contact region relative to the pressure regulating valve body.

2. The regulator according to claim 1, wherein, when the pressure regulating valve body inserted from the inlet port into the tubular path and the piston unit inserted from the outlet port into the tubular path are fit to each other in the intended axial direction position, a spring load is monitored and fixation is performed in a state in which a designated load is reached.

3. The regulator according to claim 1, wherein the valve seated seat is provided slidably in the axial direction of the tubular path in a recessed part formed in the valve seated seat holding member through a buffer formed from a polymer material having elasticity, thereby providing uniform contact between the pressure regulating valve body and the valve seated seat.

4. The regulator according to claim 2, wherein the valve seated seat is provided slidably in the axial direction of the tubular path in a recessed part formed in the valve seated seat holding member through a buffer formed from a polymer material having elasticity, thereby providing uniform contact between the pressure regulating valve body and the valve seated seat.

5. A regulator comprising: a main body part including a tubular path with a first open end configured as an inlet port of fluid and a second open end configured as an outlet port of pressure-reduced fluid; a valve seat including a valve seated seat holding member that includes a valve seated seat on an inner side and in which a through hole in an axial direction of the tubular path is formed; a pressure regulation chamber arranged on an inner side of the inlet port in the tubular path through the valve seat; a piston pressure regulating valve including a pressure regulating valve body that has a leading end surface configured to be in contact with the valve seated seat at a contact location, wherein the pressure regulating body includes an inner peripheral leading end, on a side of the valve seated seat, having a tapered portion that is enlarged toward a leading end direction; a piston unit formed around an outer periphery, on a side of the outlet port in the tubular path, of the pressure regulating valve body is biased in an outlet port direction in the tubular path between the pressure regulation chamber and the outlet port in the tubular path by a pressure regulating spring having a predetermined load and arranged slidably in the axial direction of the tubular path in an atmosphere chamber provided coaxially in parallel with the pressure regulation chamber around the piston unit; and a fuel airtight seal, wherein the contact location and the fuel airtight seal have an equivalent diameter, the fuel airtight seal is configured to fit between an inner peripheral surface of the tubular path and the outer periphery of the pressure regulating valve body, the inner peripheral surface is arranged to face the valve seated seat, and the valve seated seat includes an outer peripheral edge having a rounded contact region relative to the pressure regulating valve body.

6. The regulator according to claim 5, wherein, when the pressure regulating valve body inserted from the inlet port into the tubular path and the piston unit inserted from the outlet port into the tubular path are fit to each other, a spring load is monitored and fixation is performed in a state in which a designated load is reached.

7. The regulator according to claim 5, wherein the valve seated seat is provided slidably in the axial direction of the tubular path in a recessed part formed in the valve seated seat holding member through a buffer formed from a polymer material having elasticity, thereby providing uniform contact between the pressure regulating valve body and the valve seated seat.

* * * * *